Patented Oct. 4, 1949

2,483,936

UNITED STATES PATENT OFFICE 2,483,936

DRILLING FLUID

Perry L. Roberts, Bartlesville, Okla., assignor to Phillips Petroleum Company, a corporation of Delaware No Drawing. Application November 18, 1947, Serial No. 786,797

4 Claims. (Cl. 252—8.5)

This invention relates to water base drilling muds containing a water soluble oxidized mannogalactan. In one aspect, it relates to drilling fluids suitable for drilling and heaving shale. In another aspect, it relates to drilling fluids having a high salt content due either to deliberate addition of salt or due to contamination of the mud with salt from natural formations or from connate waters. In still another aspect, it relates to methods of drilling or controlling wells with such fluids.

In the art of drilling wells, especially by the rotary method, it is necessary to use a drilling mud, as is well understood in the art. The drilling mud lubricates the drill string, carries the cuttings to the surface of the well and forms a filter cake on the walls of the well to prevent the loss of at least any substantial amount of water from the drilling mud to the natural formations penetrated. In order to perform these important functions properly, the drilling mud must have suitable viscosity, gel strength, and water loss properties at all times in spite of adverse conditions encountered in drilling the well.

In drilling wells there are two major difficulties caused by natural formations penetrated. One of these difficulties is the encountering of salt formations. Salt will cut ordinary drilling mud so that the clay particles are flocculated and the viscosity becomes too high, and there is grave danger of the drilling pipe twisting in half, or of gas cutting of the mud, or of a blowout occurring due to the salt cutting of this mud. Another difficulty is the encountering of formations known as heaving shale. A heaving shale absorbs water from the drilling mud and by a caving or disintegrating action common to clay and shale, or by a swelling action common to bentonite materials, the well hole is closed around the drill string, choking off the circulation of drilling mud and often seizing the drill string so that it twists in half.

The principal object of my invention is to produce a drilling mud which can be used, not only in ordinary formations, but which will resist contamination by salt and which will reduce the loss of water from the mud to the formations penetrated and the resultant swelling and caving of heaving shale or similar formations.

Another object is to provide an improved drilling mud.

A further object is to provide a drilling mud containing water soluble oxidized mannogalactan.

Another object is to provide a drilling mud containing water soluble oxidized mannogalactan and a salt.

Numerous other objects and advantages of the invention will be apparent to those skilled in the art upon reading the following specification and the accompanying claims.

Operations

In the present invention I prefer to employ as a colloidal suspending agent or dispersing agent in my drilling mud, a water soluble oxidized mannogalactan. Mannogalactan is the polysaccharide obtained from the shells of the ivory nut, which is the nut-like seed of a South American palm, *Phytelephas macrocarpa*, family Arecaceae. Other sources of mannogalactan are the seed of the flame tree, *Delonix regia*; guar seed, *Cyamopsis tetragonoloba*; tara seed, *Caesalpinia spinosa*; and locust beans, *Ceratonia siliqua*. Oxidation is brought about by the use of sodium peroxide in alkaline medium. It is believed that oxidation takes effect at the glucosidic linkage and breaks the molecule into shorter chains. The oxidation should be carried out to the point that a 2 per cent solution has a viscosity below 5 cps. and preferably between 2 and 3 cps., but not to the point that the molecule is completely broken down into sugar acids or open chain acids.

I have found that about 6 lbs. of dry powdered water soluble oxidized mannogalactan per 42 gallon barrel of mud gives satisfactory results. Below 1 lb., the treating effect is generally too small. I prefer to use from 4 to 8 lbs. per barrel. The amount used depends somewhat on the nature of the earth formations encountered in the drilling. Even 12 lbs. or more per barrel of mud may be used without detrimental effect but the additional advantage to be gained does not justify the additional cost.

The water soluble oxidized mannogalactan may be in dry powdered form, the particle size not being critical. However, for rapid solution, a particle size where 95 per cent will pass an 80 mesh screen is useful.

In rotary drilling two usual methods consist of adding the oxidized mannogalactan powder to the drilling fluid flowing in the mud ditch, to the pump intake or to the mud pit by scattering the powder over the surface. An alternative method would be to make up a more or less concentrated aqueous solution of the oxidized mannogalactan and add that in a stream to the drilling mud. In some instances a pure mixture of water and oxidized mannogalactan may be used as the well drilling or well controlling fluid, but mud is generally added. The drilling fluid containing oxidized mannogalactan and water is pumped in circulation or reverse circulation in the drill string or used to fill or partially fill the well in usual operations of well drilling or well controlling of the prior art.

When oxidized mannogalactan is so used in sufficient amount, a new result is achieved in that salt water does not alter the mud qualities enough to ruin it for drilling, and the caving and heaving of formations exposed to it is inhibited. Suitable control of mud drilling agents may be maintained by the use of phosphates, alkalis, and/or quebracho as desired.

The mode or theory of operation by which the water soluble oxidized mannogalactan protects the surface of the clay or bentonite from attack by water is obscure. It is believed that oxidized mannogalactan combines physically with the clay particles to form a disperse system. When one of these particles starts to migrate to the outside formations, it encounters an oppositely charged layer at the wall of the borehole and the charges neutralize each other, causing the small clay particles to deposit between the larger particles and thereby close up the pores through which water could pass.

Drilling muds containing water soluble oxidized mannogalactan, often have a low initial gel strength which allows gas bubbles to come out of the mud so rapidly that the possibility of gas cutting is greatly reduced. Reduction of gas cutting reduces the chances of blowouts. Water soluble oxidized mannogalactan drilling muds are often characterized by very thin filter cake thickness and by their small water loss or complete absence of water loss. This is very useful in reducing the loss of water to the formation and the resulting swelling or caving which occurs in some instances. These muds do not generally ferment or spoil. Numerous other advantages of water soluble oxidized mannogalactan drilling muds will be apparent from a study of the following representative examples.

EXAMPLE I

The oxidized mannogalactan was prepared from mannogalactan by the action of hydrogen peroxide in alkaline solution as follows:

A 50 gram sample of mannogalactan was dissolved in water and treated with sodium peroxide and hydrogen peroxide in alkaline solution. The reaction was allowed to continue until a 1 per cent aqueous solution of the product had a viscosity of between 2 and 3 cps. The product was then precipitated with a methanol-acetone mixture, filtered, washed with acetone, air dried, and ground.

EXAMPLE II

Base muds of the following compositions were prepared.

| Designation | Clay | Bentonite | BaSO$_4$ | BaCO$_3$ | H$_2$O |
|---|---|---|---|---|---|
| I | 9.17 | 0.92 | 30.00 | 0.92 | 59.00 |
| II | 10.00 | 1.00 | 30.00 | 0 | 59.00 |

A native Texas clay containing soluble calcium salts was used.

Samples of each base mud containing 0, 1, 2, 4, and 8 lbs. of oxidized mannogalactan per barrel of mud were prepared for the tests. In preparing the samples, the desired amount of oxidized mannogalactan was hydrated in 50 ml. of water and this was added to 250 ml. of base mud. These samples were each stirred for 30 minutes with a high speed mixer, allowed to stand overnight and again stirred for 30 minutes and tested according to the procedure outlined in API Code #29. The results were as shown in the following tables.

TABLE I

Mud I

| Lbs. Additive/bbl. of mud | 0 | 1 | 2 | 4 | 8 |
|---|---|---|---|---|---|
| Viscosity, cps | 13.5 | 23.5 | 12 | 11 | 26 |
| 0 Gel Strength, gms | 18 | 37 | 7 | 0 | 0 |
| 10 Min. Gel Strength, gms | 40 | 45 | 27 | 20 | 10 |
| 30 Min. Water Loss, ml | 28.5 | 31 | 29 | 16 | 4.5 |
| pH of Filtrate | 9.1 | 9.2 | 9.2 | 8.4 | 8.4 |

TABLE II

Mud II

| Lbs. Additive/bbl. of mud | 0 | 1 | 2 | 4 | 8 |
|---|---|---|---|---|---|
| Viscosity, cps | 11 | 9.5 | 7 | 9.5 | 20 |
| 0 Gel Strength, gms | 20 | 11 | 9 | 0 | 0 |
| 10 Min. Gel Strength, gms | 20 | 12 | 24 | 15 | 2 |
| 30 Min. Water Loss, ml | 55 | 65 | 58 | 29 | 5 |
| pH of Filtrate | 7.8 | 7.6 | 7.6 | 7.5 | 8.1 |

Finely ground weighting agents such as barium sulfate in powdered form may be used in combination with oxidized mannogalactan drilling muds without detrimental effect. The above simple examples are merely representative and are given to show how oxidized mannogalactan may be used in water base drilling muds by those skilled in the art. Water soluble oxidized mannogalactan is somewhat inert chemically and all of the treating and controlling agents of the drilling fluid arts may after a simple test for solubility and lack of obvious adverse reaction be employed without invention in my drilling and controlling fluid.

It is to be understood that any theory that has been advanced as to the operation of my invention has been advanced merely to facilitate the disclosure and not as the only or necessary one and my invention is not limited by any specific theory of operation but only by the following claims.

Having fully described my invention, I claim:

1. A water base well drilling mud comprising in combination sufficient water to maintain the mud as a fluid, sufficient clayey material to form a filter cake on the wall of the well, and from 1 to 8 pounds of water soluble oxidized mannogalactan per 42 gallon barrel of mud.

2. A water base well drilling mud comprising an aqueous fluid mixture containing inorganic suspended solids which form a filter cake on the wall of the well, and from 1 to 8 pounds of water soluble oxidized mannogalactan per 42 gallon barrel of mud.

3. A water base well drilling mud comprising in combination sufficient water to maintain the mud as a fluid, sufficient clayey material to form a filter cake on the wall of the well, and water soluble oxidized mannogalactan in an amount sufficient to reduce water loss due to filtration through said filter cake but insufficient to increase the viscosity of said drilling mud to such an extent that it cannot be circulated.

4. A water base well drilling mud comprising an aqueous fluid mixture containing inorganic suspended solids which form a filter cake on the wall of the well, and water soluble oxidized mannogalactan in an amount sufficient to reduce water loss due to filtration through said filter cake but insufficient to increase the viscosity of said drilling mud to such an extent that it cannot be circulated.

PERRY L. ROBERTS.

REFERENCES CITED

The following references are of record in the file of this patent:

UNITED STATES PATENTS

| Number | Name | Date |
| --- | --- | --- |
| 2,191,312 | Cannon | Feb. 20, 1940 |
| 2,295,067 | Williams | Sept. 8, 1942 |
| 2,388,986 | Chapman | May 7, 1946 |
| 2,425,768 | Wagner | Aug. 19, 1947 |